(12) United States Patent
Rietdyk

(10) Patent No.: US 11,395,522 B2
(45) Date of Patent: Jul. 26, 2022

(54) HELMET WITH IMPACT ABSORBING CONNECTOR

(71) Applicant: Guido Rietdyk, Rolling Hills, CA (US)

(72) Inventor: Guido Rietdyk, Rolling Hills, CA (US)

( * ) Notice: Subject to any disclaimer, the term of this patent is extended or adjusted under 35 U.S.C. 154(b) by 0 days.

(21) Appl. No.: 17/179,275

(22) Filed: Feb. 18, 2021

(65) Prior Publication Data

US 2021/0169167 A1 Jun. 10, 2021

Related U.S. Application Data

(63) Continuation of application No. 16/262,636, filed on Jan. 30, 2019, now Pat. No. 10,973,273.

(51) Int. Cl.
*A42B 3/14* (2006.01)
*F16B 21/09* (2006.01)
*A42B 3/08* (2006.01)

(52) U.S. Cl.
CPC ............... *A42B 3/14* (2013.01); *F16B 21/09* (2013.01); *A42B 3/08* (2013.01)

(58) Field of Classification Search
CPC ... A42B 3/14; A42B 3/08; F16B 21/09; F16B 2/22; F16B 5/0692
See application file for complete search history.

(56) References Cited

U.S. PATENT DOCUMENTS

| 2,758,305 | A | 8/1956 | Gross |
| 2,858,538 | A | 11/1958 | Simpson |
| 2,931,042 | A | 4/1960 | Austin |
| 3,192,536 | A | 7/1965 | Benner |
| 3,388,405 | A | 6/1968 | Simpson et al. |
| 3,555,560 | A * | 1/1971 | Raschke ............... A42B 3/14 2/416 |
| 3,797,039 | A * | 3/1974 | Penberthy ............. A42B 3/14 2/416 |
| 4,055,860 | A | 11/1977 | King |
| 4,463,456 | A | 8/1984 | Hanson |
| 5,898,949 | A | 5/1999 | Barthold et al. |
| 6,081,931 | A | 7/2000 | Burns et al. |
| 6,609,254 | B2 | 8/2003 | Bielefeld et al. |
| 9,307,802 | B2 | 4/2016 | Hall |
| 2016/0338440 | A1 | 11/2016 | Popejoy |
| 2017/0245578 | A1* | 8/2017 | Xiong ................... A42B 3/147 |
| 2017/0251743 | A1 | 9/2017 | Popejoy |

FOREIGN PATENT DOCUMENTS

| AU | 2006100989 A4 | 12/2006 |
| CN | 2787017 Y | 6/2006 |

* cited by examiner

*Primary Examiner* — Katherine M Moran
*Assistant Examiner* — Erick I Lopez
(74) *Attorney, Agent, or Firm* — Lowe Graham Jones PLLC

(57) ABSTRACT

Embodiments are directed to a helmet. The helmet preferably includes a shell, a suspension, and a connector. The suspension preferably includes a crown strap. The connector preferably couples to the shell and the crown strap. The connector preferably has a shock absorber operatively disposed between the shell and the crown strap to absorb at least a portion of a force of impact delivered to the shell.

16 Claims, 10 Drawing Sheets

US 11,395,522 B2

HELMET WITH IMPACT ABSORBING CONNECTOR

CROSS-REFERENCE TO RELATED APPLICATION

The present application is a continuation of U.S. patent application Ser. No. 16/262,636, entitled HELMET WITH IMPACT ABSORBING CONNECTOR, filed Jan. 30, 2019, the content of which is hereby incorporated by reference.

FIELD OF THE INVENTION

This application relates to impact absorbing connectors for helmet suspensions and, more particularly, yet not exclusively, impact absorbing connectors for hard-hat suspensions.

BACKGROUND OF THE INVENTION

Typical helmets, such as hard hats, have a hard shell and a suspension that spaces the shell apart from the wearer's head to spread the force of impact delivered to the shell over the wearer's head. The suspension often includes a headband that surrounds the circumference of the wearer's head (when viewed from above) and crown straps that extend from the headband over the top of the wearer's head to the other side of the headband or to a crown pad positioned at the top of the wearer's head. Connectors connect the hard shell to the headband. When an impact is delivered to the shell (for example, a tool falling from above), the downward force of the impact is transferred to the suspension, which distributes the force over the wearer's head. Accordingly, there exists a need for an improved helmet that absorbs more of the force of impact delivered to the shell.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Preferred Embodiment, which is to be read in association with the accompanying drawings, wherein.

SUMMARY OF THE INVENTION

Figure 1:
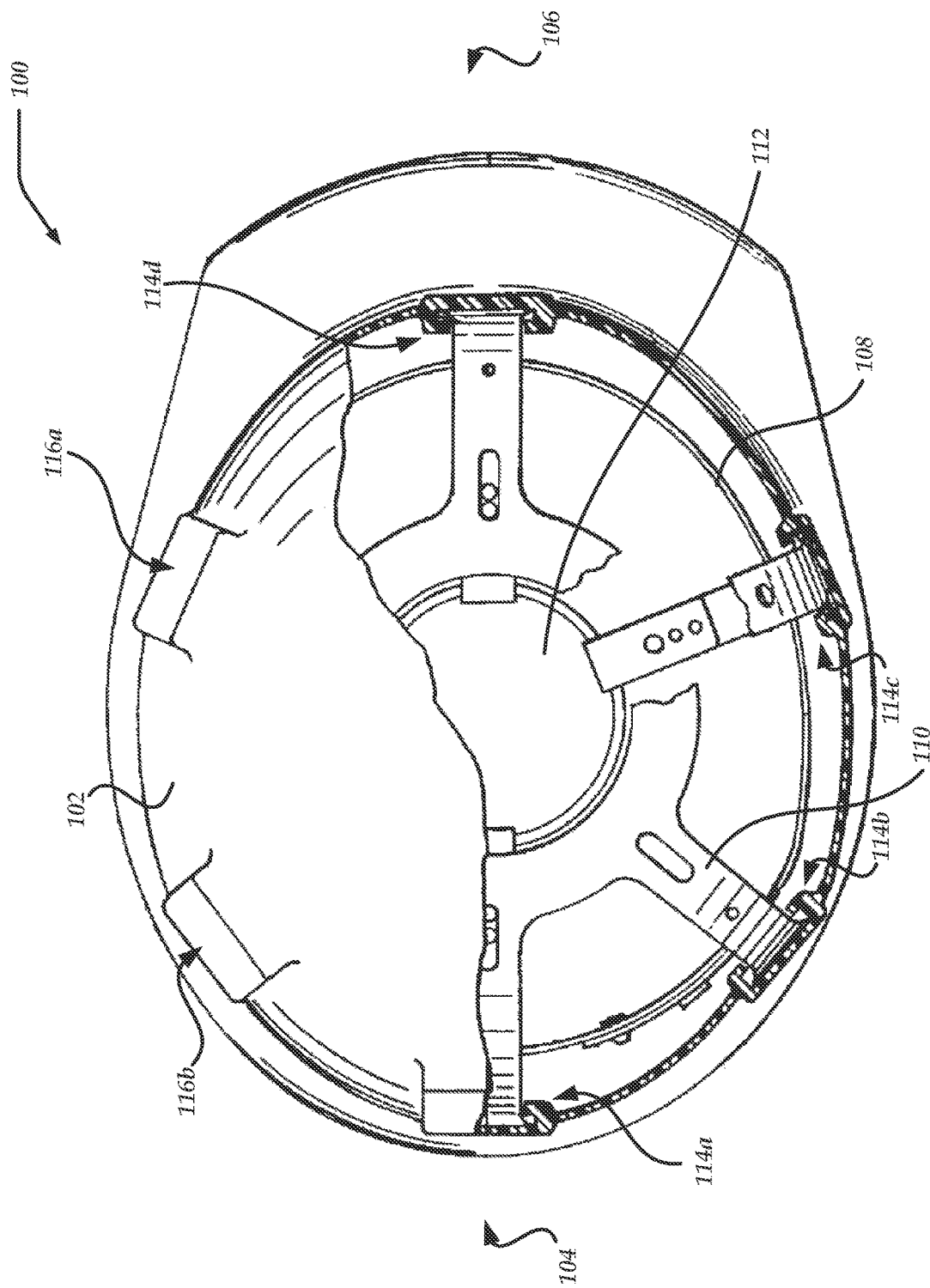
FIG. 1 is a partial cutaway top view of a helmet.

The following briefly describes example embodiments of the invention to provide a basic understanding of some aspects of the invention. This brief description is not intended as an extensive overview. It is not intended to identify key or critical elements or to delineate or otherwise narrow the scope. Its purpose is merely to present some concepts in a simplified form as a prelude to the more detailed description that is presented later.

Briefly stated, various embodiments are directed to a helmet, such as a hard hat. The helmet includes a shell, such as a hard-hat shell. The helmet also includes a suspension and a connector. The suspension preferably includes a crown strap. The connector couples to the shell and a portion of the suspension, such as the crown strap. The connector has a shock absorber that is operatively disposed between the shell and the coupled portion of the suspension, such as the crown strap, to absorb at least a portion of a force of impact delivered to the shell.

Preferably, an element fixedly extends inward from the shell. In some versions, the connector has a retention clip that retains the element in engagement with the connector until at least a portion of the retention clip moves relative to another portion of the connector. Preferably, the connector has a headband-connector body that is movable relative to the other portion of the connector to provide user access to the retention clip to release the element. In some versions, the element has a shaft and a flange. Preferably, the shaft fixedly extends inward from the shell. In some versions, the flange is inwardly spaced apart from the shell. Preferably, the connector has an opening that has a first portion and a second portion. In some versions, the first portion is larger than the flange to facilitate insertably receiving the element in a first dimension. Preferably, the second portion is larger than the shaft and is at least partially smaller than the flange to facilitate slidably receiving the element in a second dimension that is transverse to the first dimension and to facilitate retaining the element in the first dimension.

In some versions, a chin strap snap-attaches to the connector.

Preferably, the shock absorber includes an S-shaped curve.

In some versions, the connector has a shell-connector body and a crown-strap-connector body operatively disposed opposite the shock absorber from the shell-connector body.

Preferably, the connector has a headband-connector body and a crown-strap-connector body operatively disposed opposite the shock absorber from the headband-connector body.

Also, briefly stated, various embodiments are directed to a connector for connecting a suspension (for example, a helmet suspension, such as a hard-hat suspension) to a shell (for example, a helmet shell, such as a hard-hat shell). Preferably, the connector includes a shell-connector body, a suspension-connector body (for example, a crown-strap-connector body), and a shock absorber. The shell-connector body is sized and dimensioned to couple to the shell. The suspension-connector body is sized and dimensioned to couple to a portion of the suspension, such as a crown strap. The shock absorber is operatively disposed between the shell-connector body and the suspension-connector body to absorb at least a portion of a force of impact delivered to the shell.

Preferably, the connector has a retention clip that is sized and dimensioned to retain in engagement with the shell-connector body an element that extends inward from the shell. In some versions, at least a portion of the retention clip is movable relative to the shell-connector body to release the element from engagement with the shell-connector body. Preferably, a portion of the connector, such as a headband-connector body, is movable relative to the shell-connector body to provide access to the retention clip to release the element. In some versions, the shell-connector body has an opening that has a first portion and a second portion. Preferably, the first portion is sized and dimensioned to insertably receive the element in a first dimension. In some versions, the second portion is sized and dimensioned to slidably receive the element in a second dimension that is transverse to the first dimension and to retain the element in the first dimension. Preferably, the second portion has a counterbore that is sized and dimensioned to slidably receive the element in the second dimension and to retain the element in the first dimension.

In some versions, the connector has a chin-strap-connector body that is sized and dimensioned to snap-attach to a chin strap.

Preferably, the shock absorber includes an S-shaped curve.

In some versions, the connector has a headband-connector body that is operatively disposed opposite the shock absorber from the suspension-connector body.

DETAILED DESCRIPTION OF THE PREFERRED EMBODIMENT

The various embodiments now will be described more fully hereinafter with reference to the accompanying drawings, which form a part hereof and show, by way of illustration, specific example embodiments by which the invention may be practiced. The embodiments may, however, be embodied in many different forms and should not be construed as limited to the embodiments set forth herein; rather, these embodiments are provided so that this disclosure will be thorough and complete and will fully convey the scope of the embodiments to those skilled in the art. Among other things, the various embodiments may be methods, systems, or devices. The following detailed description is, therefore, not to be taken in a limiting sense.

As used herein, the term "absorber", "impact absorber", or "shock absorber" refers to an element in a helmet (for example, a hard hat) that absorbs 20 or more pounds of impact force without breaking (for example, separating into multiple pieces) and preferably absorbs 30, 45, 60, 75, or more pounds of impact force without breaking. Typical connectors and suspension straps in helmets such as hard hats include structures or materials that unintentionally deform or stretch to a limited degree when enough force is applied to them. Accordingly, typical connectors and suspension straps in helmets such as hard hats may absorb only a small amount of energy responsive to an impact (for example, 5 or fewer pounds per connector) and, thus, are not shock absorbers as defined herein.

As used herein, the term "or" refers to a grammatical conjunction to indicate that one or more of the connected terms may be employed. For example, the phrase "one or more A, B, or C" is employed to discretely refer to each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" is not exclusive and allows for being based on additional factors not described, unless the context clearly dictates otherwise. In addition, the meaning of "a," "an," and "the" include plural references. Plural references are intended to also disclose the singular, unless the context clearly dictates otherwise. The meaning of "in" includes "in" and "on." Also, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise.

FIG. 1 is an overhead view of preferred helmet 100. As shown in FIG. 1, helmet 100 is a hard hat having shell 102 with rear-end portion 104 and front-end portion 106. Helmet 100 has a suspension that preferably includes headband 108 (with an optional circumference-adjuster knob (not shown) disposed at the rear of headband 108) and one or more crown straps, such as crown strap 110. In FIG. 1, the crown straps extend from connectors to crown pad 112. The connectors connect the suspension to shell 102 and preferably include six connectors, such as connectors 114a-114d and connectors (not shown) disposed under positions 116a and 116b in shell 102. As shown in FIG. 1, the connectors are evenly spaced apart from each other by 60° along the circumference of the inner surface of shell 102. In other versions, the connectors are disposed in different positions, such as at the left and right sides offset from the longitudinal axis of shell 102 (intersecting connectors 114a and 114d in FIG. 1) by 90° and at positions offset forward and rearward of the left and right connectors by 45°.

Figure 2:
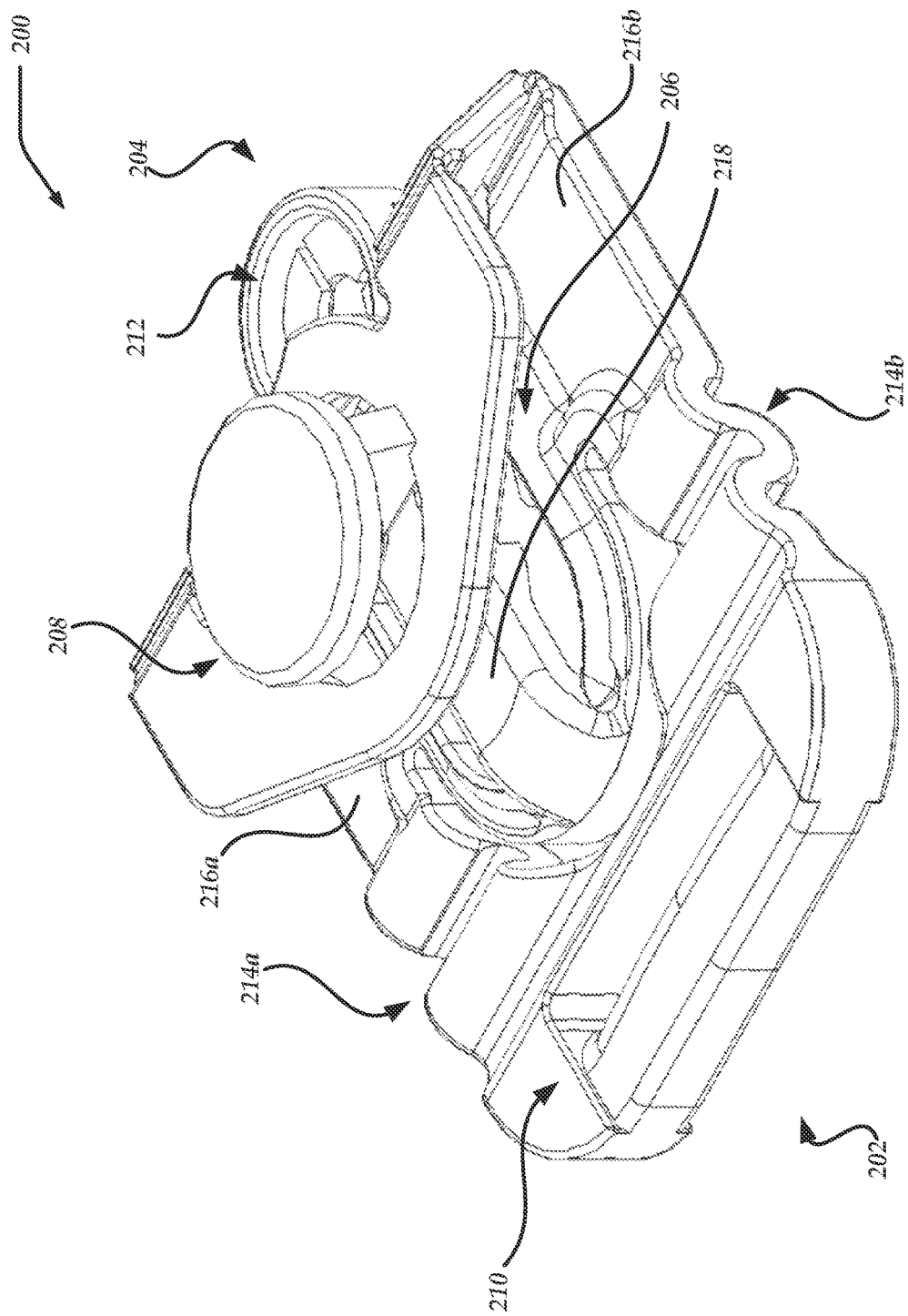
FIG. 2 is an isometric view of a connector for a helmet suspension.

FIG. 2 is an isometric top view of preferred connector 200 for the suspension of helmet 100. Connector 200 has top-end portion 202 and bottom-end portion 204. Connector 200 preferably has shell-connector body 206, headband-connector body 208, and crown-strap-connector body 210. Connector 200 optionally includes chin-strap-connector body 212. For example, connectors disposed immediately forward and rearward of a wearer's ears (see FIG. 1 for example, connectors 114b, 114c and the connectors disposed at positions 116a, 116b) may have chin-strap-connector bodies to facilitate connecting a chin strap to shell 102. The chin strap may have Y-shaped ends that extend on the front and rear sides of each ear.

Preferably, one or more shock absorbers, such as absorber 214a or absorber 214b, are disposed between crown-strap-connector body 210 and one or more of the other bodies to facilitate absorbing the force of impact applied to shell 102, through connector 200, and toward the crown straps. Because the shock absorbers in FIG. 2 are disposed between crown-strap-connector body 210 and both shell-connector body 206 and headband-connector body 208, the shock absorbers facilitate shell-connector body 206 and headband-connector body 208 moving relative to crown-strap-connector body 210 responsive to the force of impact. As shown in FIG. 2, the shock absorbers may include in-line S-shaped curves that straighten as they absorb the force of impact. Preferably, the shock absorbers are sized and dimensioned (for example, length, width, thickness, radius of curves, or other shapes or dimensions) to each absorb 20, 30, 45, 60, 75, or more pounds. Each connector preferably has two shock absorbers, thereby facilitating absorbing 40, 60, 90, 120, 175, or more pounds per connector. Helmet 100 preferably has six connectors (each with two shock absorbers for a total of twelve impact zones), thereby facilitating absorbing 240, 360, 540, 720, 1,050, or more pounds. Accordingly, connector 200 facilitates reducing the amount of the force of impact that is transferred to the suspension of helmet 100, thereby facilitating reducing the likelihood or severity of injury incurred by the wearer.

Preferably, the S-shaped curves of shock absorbers 214a, 214b have lengths measured along the height dimension that extends from bottom-end portion 204 to top-end portion 202, thicknesses measured along the dimension that extends inward and outward when connected to shell 102 (see FIGS. 1 and 9), and widths measured in a dimension that is transverse (preferably perpendicular) to the lengths and thicknesses and preferably parallel to an edge or longitudinal axis of the slot in crown-strap connector body 210. Most preferably, the S-shaped curves of shock absorbers 214a, 214b have outer diameters of 3, 3.5, 4, 4.5, 5, or more millimeters, inner diameters of 0.25, 0.5, 0.75, 1.0, 1.25, 1.5, 1.75, or more millimeters, lengths of 5, 10, 15, 20, or more millimeters, thicknesses of 0.9, 1.1, 1.3, 1.5, 1.7, 1.9, or more millimeters, and widths of 3, 4, 5, 6, 7, or more millimeters.

As shown in FIG. 2, side wings 216a and 216b connect shock absorbers 214a, 214b to shell-connector body 206. Preferably, side wings 216a and 216b also connect headband-connector body 208 to shell-connector body 206. Retention clip 218 preferably extends along at least a portion of shell-connector body 206 to facilitate securing an element extending from shell 102 (see FIG. 9). As shown in FIG. 2, connector 200 is a single, unitary structure. In other versions, one or more portions of connector 200 are separable from one or more other portions of connector 200.

Figure 3:
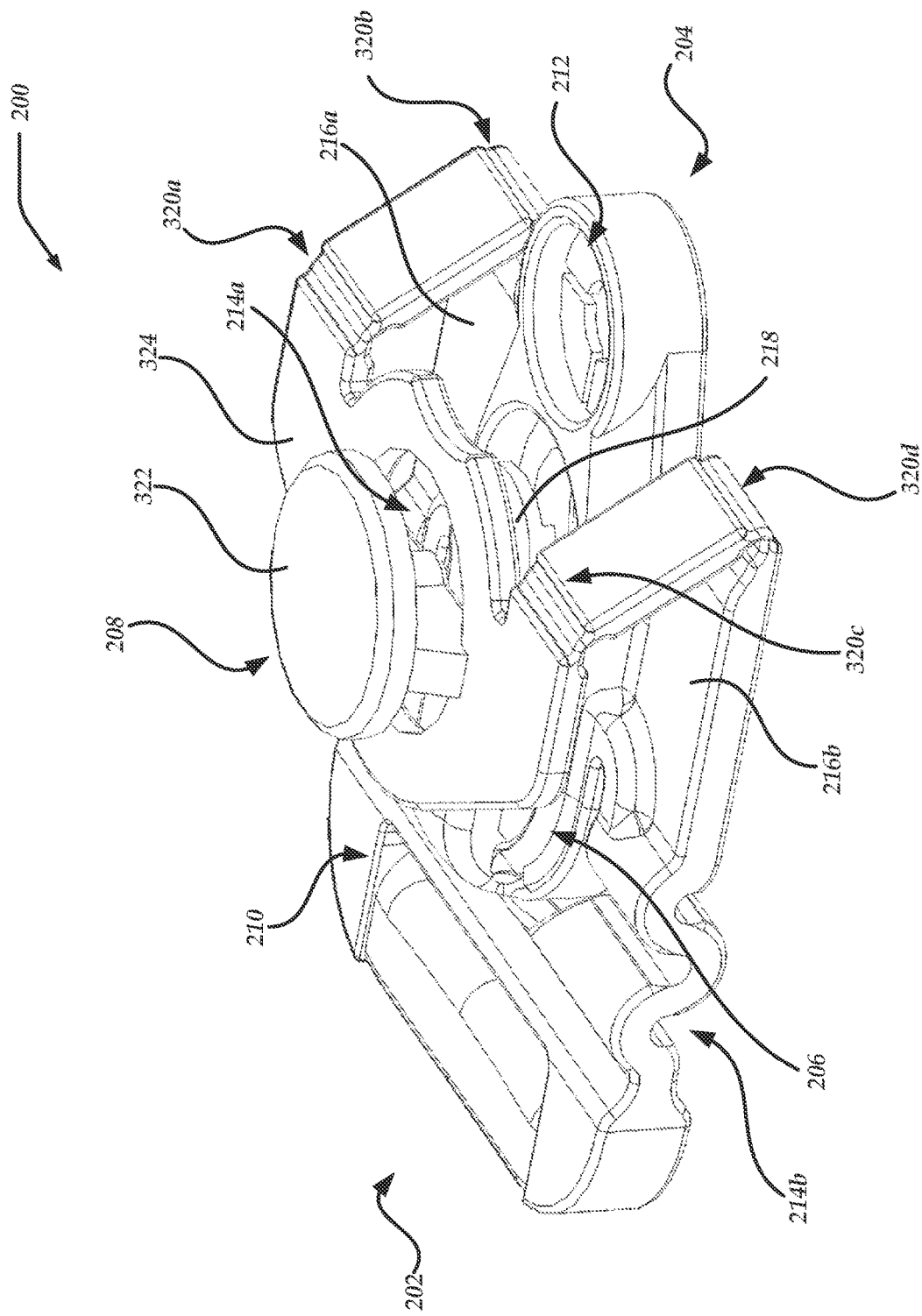
FIG. 3 is an isometric view of the connector of FIG. 2 from the other side.

FIG. 3 is an isometric bottom view of connector 200. One or more movable joints, such as live hinges 320a-320d, are preferably positioned between headband-connector body 208 and one or more other portions of connector 200, such as wings 216a, 216b. The movable joints facilitate moving headband-connector body 208 relative to retention clip 218 to provide a user access to retention clip 218 to release retention clip 218 from the secured element extending from shell 102 (see FIG. 10). Headband-connector body 208 preferably includes a headband connector, such as button 322 that extends from platform 324 connected to the movable joints. The movable joints also facilitate adaptive fitting of the helmet to the specific head shape of the user, as the headband is able to slightly move within the shell.

Figure 4:
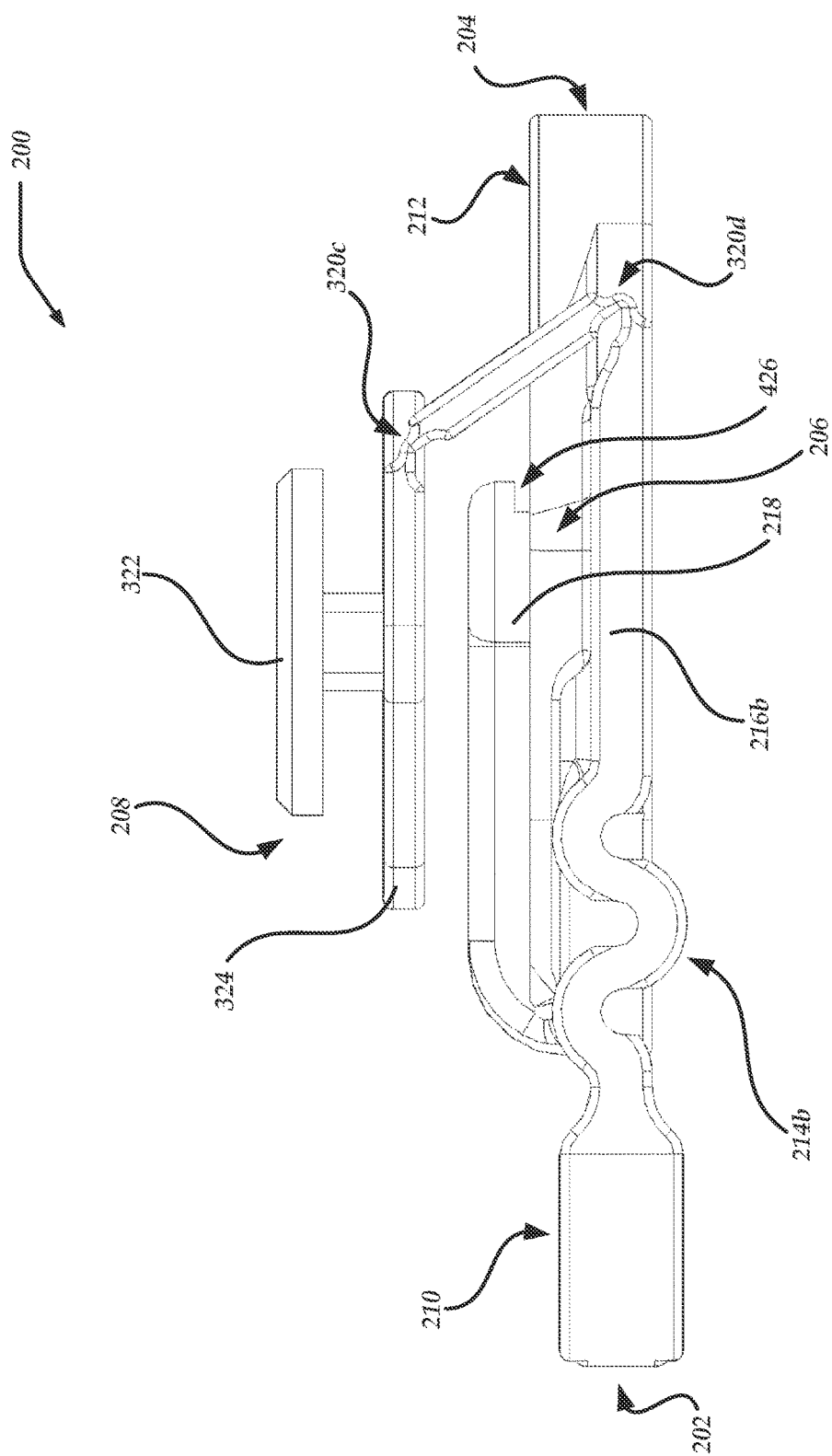
FIG. 4 is a side elevational view of the connector of FIG. 2.

FIG. 4 is a side elevational view of connector 200. Platform 324 is preferably inwardly spaced apart from retention clip 218 and shell-connector body 206 (inward toward the center of the helmet is upward on the page of FIG. 4) to facilitate maintaining space between a wearer's head and shell 102. Retention clip 218 preferably includes recess 426 disposed at the bottom-end portion of retention clip 218 to facilitate a user sliding her finger under retention clip 218 to lift retention clip relative to shell-connector body 206 to release the secured element extending from shell 102.

Figure 5:
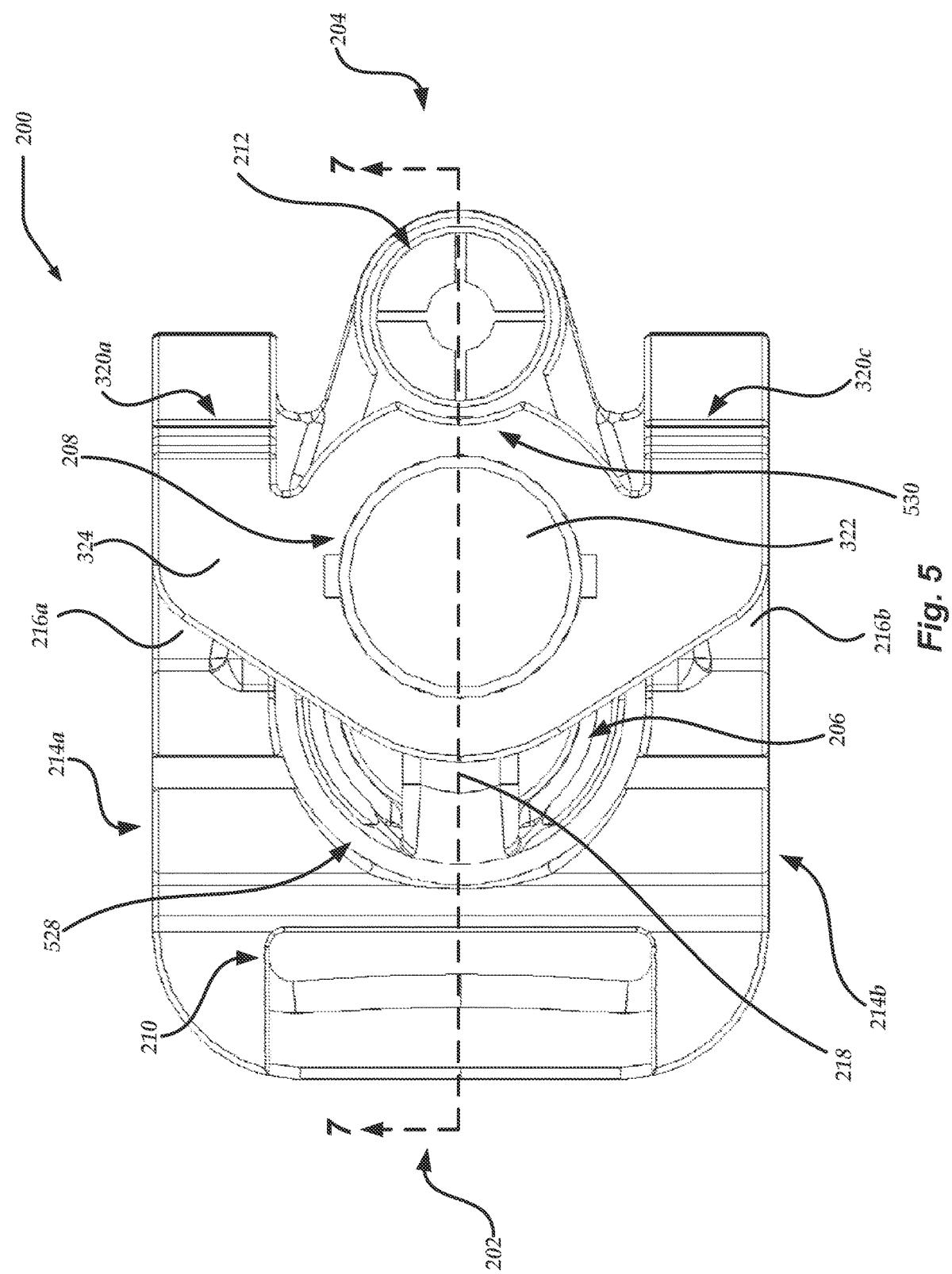
FIG. 5 is an inner-side elevational view of the connector of FIG. 2.

FIG. 5 is an inner-side elevational view of connector 200. Gap 528 preferably separates crown-strap-connector body 210 from shell-connector body 206 to facilitate shell-connector body 206 moving relative to crown-strap-connector body 210 when shock absorbers 214a, 214b elongate responsive to the force of impact to shell 102. Platform 324 preferably has recess 530 in the bottom-end portion of platform 324 to provide access to chin-strap-connector body 212 when connecting a chin strap to connector 200.

Figure 6:
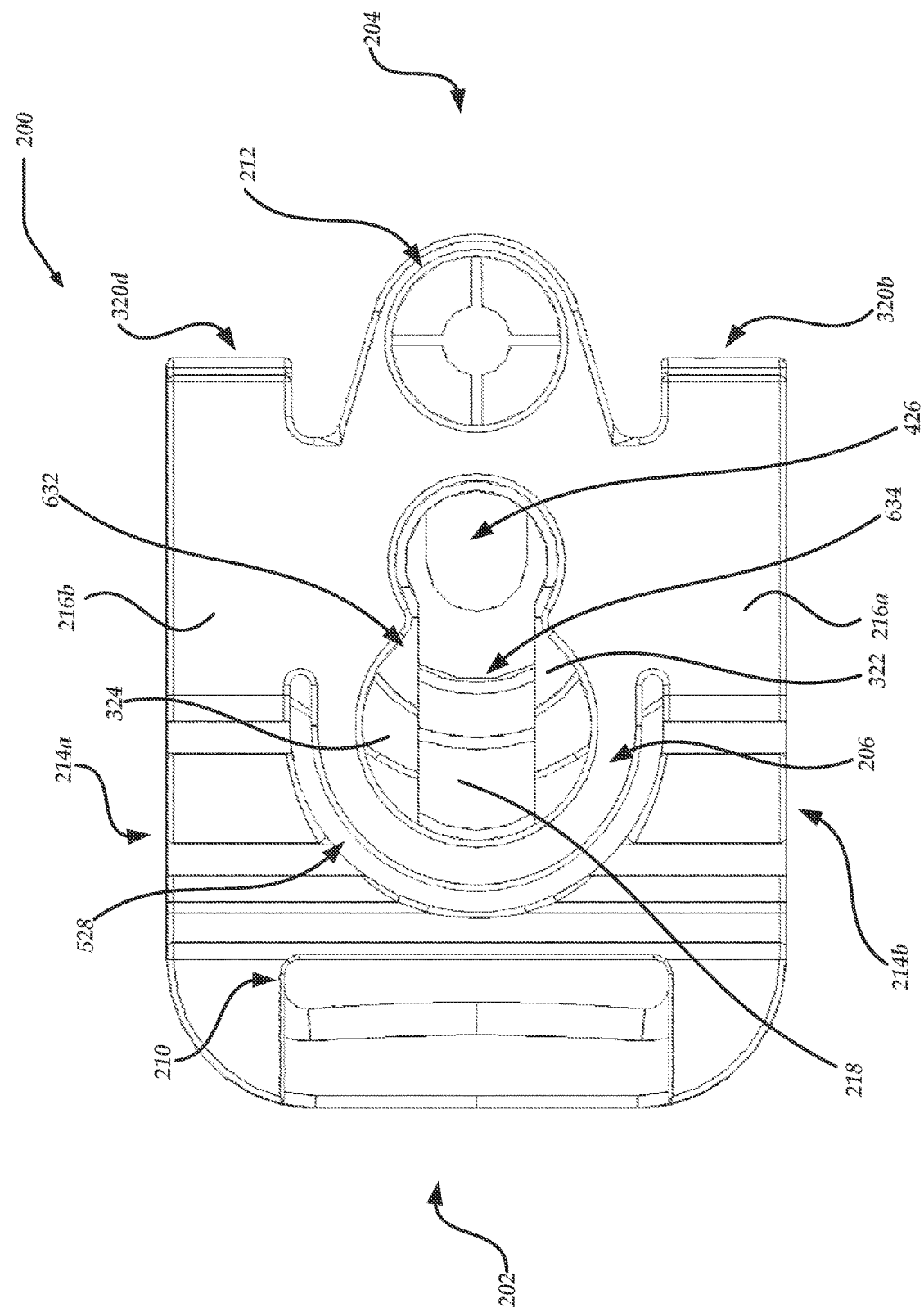
FIG. 6 is an outer-side elevational view of the connector of FIG. 2.

FIG. 6 is an outer-side elevational view of connector 200. Shell-connector body 206 preferably includes keyhole-shaped opening 632. As shown in FIG. 6, opening 632 has a top-end portion and a bottom-end portion, with the top-end portion being larger than the largest portion of an element extending from shell 102 and the bottom-end portion being smaller than the largest portion of the element to facilitate receiving and securing the element extending from shell 102 (see FIG. 9). Retention clip 218 preferably has securing ridge 634 that extends outward from the outer surface of retention clip 218 to secure the element extending from shell 102 in the bottom-end portion of opening 632, at least until a user moves retention clip 218 relative to shell-connector body 206 by pulling retention clip 218 at recess 426.

Figure 7:
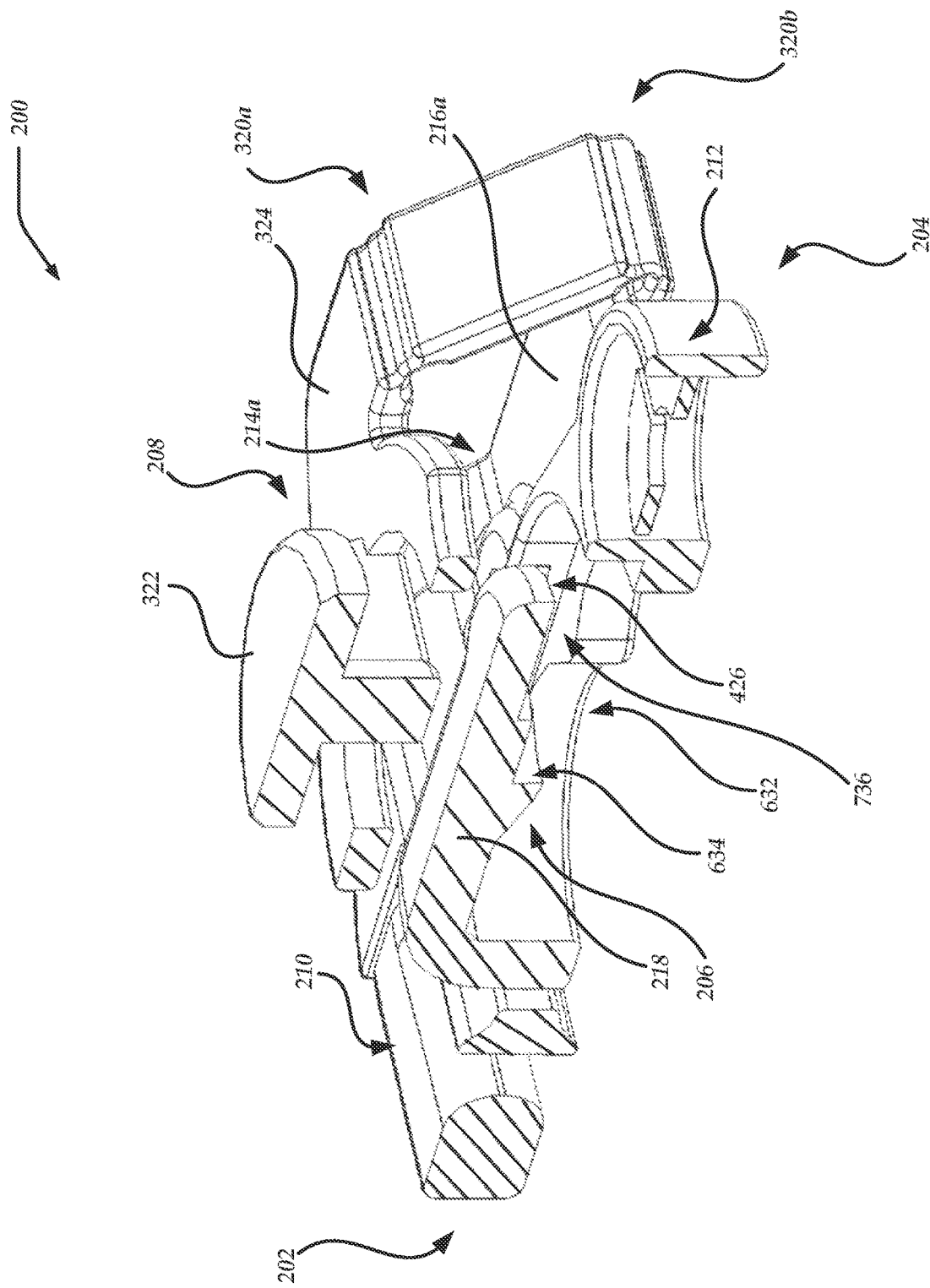
FIG. 7 is an isometric cross-sectional view of the connector of FIG. 2.

FIG. 7 is an isometric cross-sectional view of connector 200 taken along line 7-7 of FIG. 5. As shown in FIG. 7, when an element extending from shell 102 is received in the larger top-end portion of hole 632, the element pushes retention clip 218 inward relative to shell-connector body 206 as a user slides connector 200 upward relative to the element. As connector 200 is slid upward, the element slides along the ramped top-end portion of securing ridge 634 until the element is completely received in the smaller bottom-end portion of hole 632 and is positioned below the bottom horizontal edge of securing ridge 634, which allows retention clip 218 to snap back to its default position relative to shell-connector body 206 (as shown in FIG. 7). The smaller bottom-end portion of hole 632 is preferably counterbore shaped, with lip 736 radially extending from the circumferential perimeter of the smaller bottom-end portion of hole 632, thereby facilitating fixing the position of connector 200 relative to shell 100 (see FIG. 9).

Figure 8A:
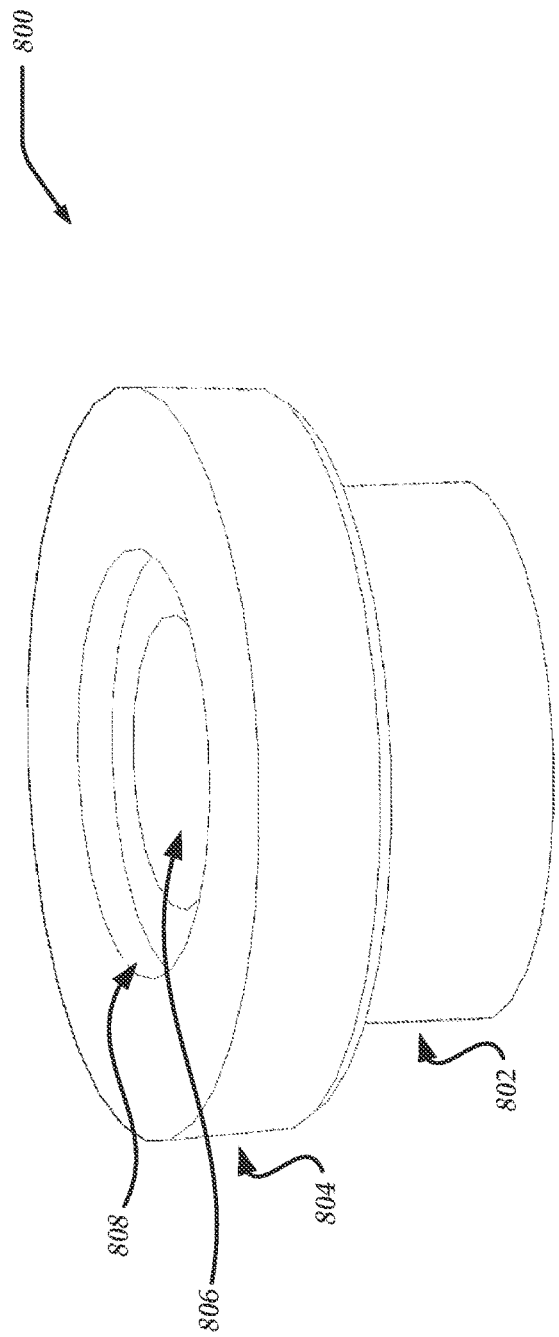
FIG. 8A is an isometric side view of a washer for connecting the connector of FIG. 2 to a helmet.
Figure 8B:
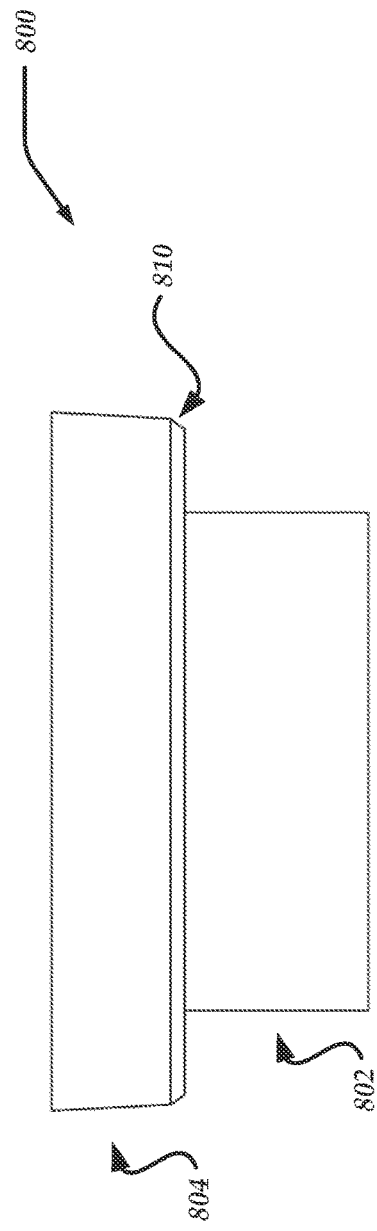
FIG. 8B is a side elevational view of the washer of FIG. 8A.
Figure 9:
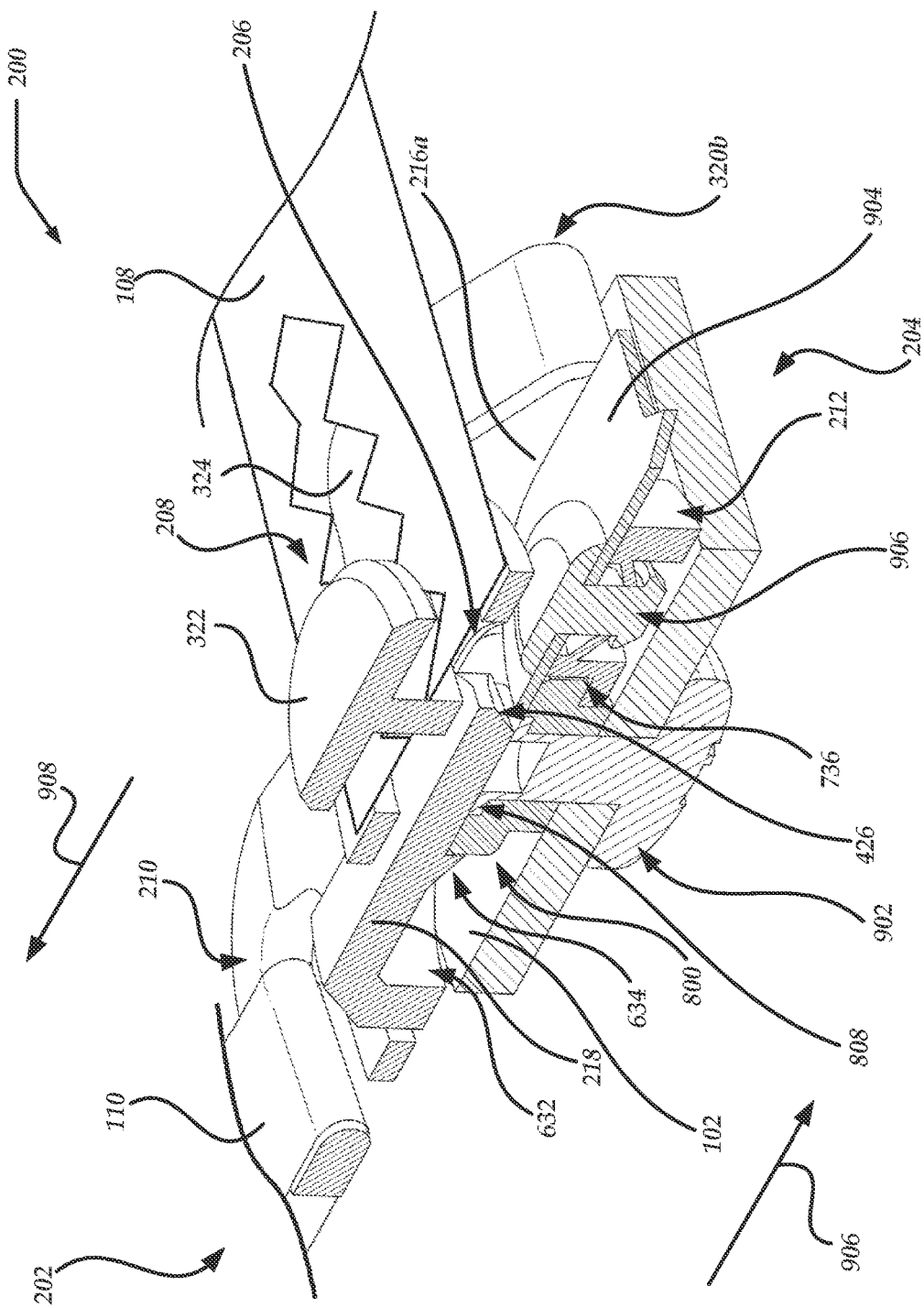
FIG. 9 is an isometric cross-sectional view of the connector of FIG. 2 connected to a helmet with the washer of FIGS. 8A and 8B.

FIGS. 8A and 8B are isometric and side elevational views respectively of washer 800 for connecting connector 200 to shell 102. Washer 800 preferably has shaft 802 and flange 804. As shown in FIGS. 8A and 8B, flange 804 has a larger outer diameter than shaft 802. The height of shaft 802 preferably matches or exceeds the thickness (in the inward-outward dimension) of lip 736 of shell-connector body 206. Washer 800 has hole 806 for receiving a rivet (see FIG. 9). The flange-end portion of washer 800 preferably has counterbore 808 to facilitate receiving a crushed end portion of the rivet, with the crushed end portion being flush with the top surface of washer 800 (inner surface when installed in helmet 100, as shown in FIG. 9). Bottom edge 810 of flange 804 (outer edge when installed in helmet 100, as shown in FIG. 9) preferably includes a chamfer to facilitate receiving lip 736 of shell-connector body 206 between flange 804 and shell 102 (see FIG. 9).

FIG. 9 is an isometric cross-sectional view of connector 200 (taken along line 7-7 in FIG. 5) connected to shell 102 with washer 800. Rivet 902 preferably extends through a portion of shell 102 with the inner-end portion of rivet 902 crushed in counterbore 806 of washer 800. As shown in FIG. 9, connector 200 has been positioned against the inner surface of shell 102 with washer 800 in the larger top-end portion of hole 632 and slid upward so that washer 800 is received in the smaller bottom-end portion of hole 632, with flange 804 of washer 800 positioned inward of lip 736 of shell-connector body 206 and below securing ridge 634 of retention clip 218, thereby securing connector 200 to shell 102. Button 322 of headband-connector body 208 is preferably received through a slot in headband 108 to facilitate rotatably adjusting the orientation of headband 108 relative to connector 200 and shell 102. As shown in FIG. 9, the slot in headband 108 is saw-toothed. In other versions, the slot has smooth inner edges that lack saw teeth. A crown strap, such as crown strap 116, is preferably looped through a slot in crown-strap-connector body 210. In versions with chin-strap-connector body 212, chin strap 904 is preferably snap-attached to chin-strap-connector body 212 with rivet 906 (although a one-way rivet is shown with a beveled edge on only the outer side of the smaller outer-end portion of rivet 906, other versions include a two-way rivet having a beveled edge on both the outer and inner sides of the smaller outer-end portion of rivet 906). As shown in FIG. 9, chin-strap-connector body 212 preferably has radially extending tabs that bend to receive or release rivet 906. As also shown in FIG. 9, the bottom-end portion of recess 426 in retention clip 218 is preferably chamfered (for example, at 15, 30, 45, or more degrees) relative to the outer surface of recess 426 to increase ease of a user placing her finger under the bottom-end portion of retention clip 218.

Washer 800 and rivet 902 are preferably brass to facilitate self-lubrication. Rivet 906 is preferably plastic. Washer 800 is preferably injection molded and defines the distance between connector 200 and the inner surface of shell 102. In some versions, the inner surface of shell 102 may be spaced apart from the wearer's head by 0.5, 1.0, 1.5, or more inches. The combination of washer 800 and shell-connector body 206 facilitates connector 200 rotating relative to shell 102 to facilitate fitting an increased variety of head shapes compared to a connector that fails to rotate relative to a helmet shell. Shell 102 may include composite, carbon, fiberglass-reinforced plastic ("FRP"), or plastic materials. Connector 200 preferably includes short strands of fiberglass in nylon that is injected molded to form connector 200.

When an object impacts the crown of shell 102 (for example, a tool falling from above), the force of impact moves shell in downward direction 906 and passes through shell-connector body 206 to shock absorbers 214a, 214b either directly or through side wings 216a, 216b. Tension in the crown straps pulls against connector 200 in upward direction 908. Shock absorbers 214a, 214b deform or stretch (for example, elongate or straighten) to absorb at least a portion of one or more of these forces. In contrast, the typical connector causes a higher portion of one or more of these forces to be transferred to the head of the wearer. Moreover, shock absorbers 214a, 214b are sized and dimensioned to perform their absorbing function without breaking, thereby facilitating preventing shell 102 from contacting the head of the wearer.

Most structures and materials deform or stretch to a limited degree when enough force is applied to them. However, typical connectors and suspensions in helmets such as hard hats absorb significantly less energy responsive to an impact (for example, 5, 10, 15, or less pounds per connector) than connector 200. Typical connectors are also likely to break (or have components that break) responsive to an impact force that is sufficient to cause a portion of the typical connector to deform or stretch. Because the crown straps typically include strong materials, such as woven nylon as found in seatbelts or climbing lines, the straps and corresponding stitching is typically not a weak point, and, instead, the typical connectors or the shell breaks upon a large impact, thereby allowing the shell or the impacting object to contact the wearer's head and transfer a large portion of the force of impact to the wearer's head. Accordingly, connector 200 facilitates dramatically improving the degree of impact protection offered to the wearer of a helmet such as a hard hat in comparison to typical connectors that lack shock absorbers.

Figure 10:
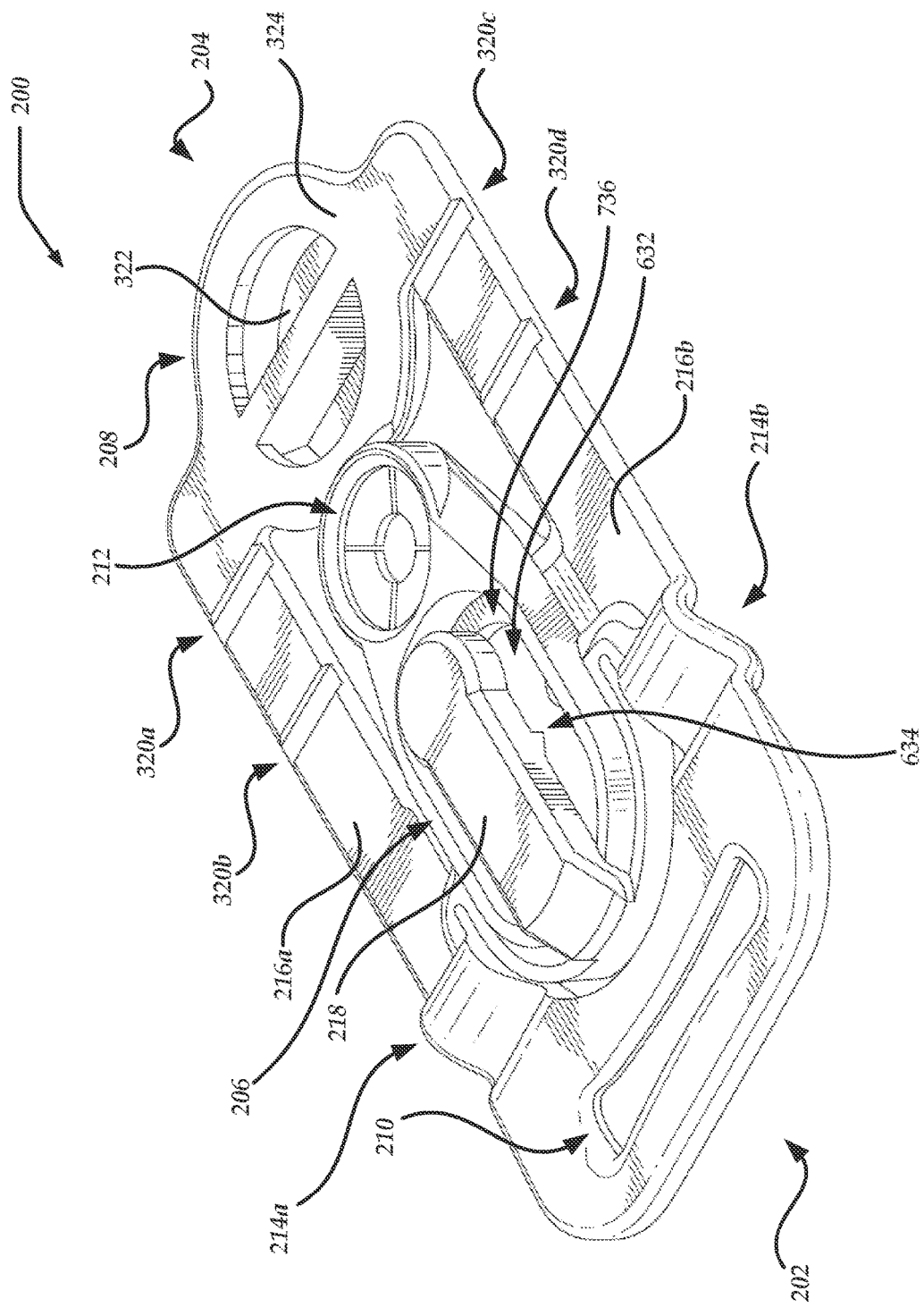
FIG. 10 is an isometric top elevational view of the connector of FIG. 2 in an open configuration.

FIG. 10 is an isometric top view of connector 200 in an open (unfolded) configuration (contrast with the closed configuration of FIG. 2). After connector 200 absorbs a large impact and one or more shock absorbers have deformed or stretched (or to change suspension, wear without suspension, or replace during manufacturing), a user should replace connector 200 with a new connector. To remove connector 200 from shell 102, headband 108 is preferably separated from headband-connector body 208 by pulling headband 108 away from button 322 so that button 322 slides through the slot of headband 108. Next, connector 200 is preferably transitioned from the closed configuration (see FIG. 2) to the open configuration shown in FIG. 10 by unfolding platform 324 about the movable joints (for example, hinges 320a-320d) to expose the free-end portion (for example, the bottom-end portion) of retention clip 218. The user can place her finger under or in recess 426, pull the free-end portion of retention clip 218 away from shell-connector body 206, slide connector 200 downward relative to shell 102 to move washer 800 relative to shell-connector body 206 and position washer 800 in the larger top-end portion of hole 632, and pull connector 200 inwardly away from shell 102. A new connector may then be installed.

The foregoing examples should not be construed as limiting or exhaustive, yet rather, illustrative use cases to show implementations of at least one of the various embodiments of the invention. Accordingly, many changes can be made without departing from the spirit and scope of the invention. Thus, the scope of the invention is not limited by the disclosure of the examples. Instead, the invention should be determined entirely by reference to the claims that follow.

The embodiments of the invention in which an exclusive property or privilege is claimed are defined as follows:

1. A connector for connecting a hard-hat suspension to a hard-hat shell, the connector comprising:
    a shell-connector body configured to couple to the hard-hat shell;
    a suspension-connector body configured to couple to the hard-hat suspension;
    a shock absorber operatively disposed between the shell-connector body and the suspension-connector body to absorb at least a portion of a force of impact delivered to the hard-hat shell; and
    a headband-connector body having a first portion configured to couple to a hard-hat headband, a platform including an upper portion and an opposing lower portion, and the first portion extending from the platform, the headband-connector body being coupled to another portion of the connector at only a lower portion of the headband-connector body while neither the upper portion nor the first portion of the headband-connector body couple to other portions of the connector.

2. The connector of claim 1, further comprising a retention clip, at least a portion of the retention clip being movable relative to the shell-connector body, the retention clip being configured to cover an element that extends inward from the hard-hat shell and into engagement with the shell-connector body to retain the element in engagement with the shell-connector body.

3. The connector of claim 2, wherein the shell-connector body defines a hole and a lip radially extending inward from the perimeter of the hole, the lip and the retention clip being disposed on opposite sides of the element when the element is retained in engagement with the shell-connector body to prevent the shell-connector body from being pulled away from the hard-hat shell.

4. The connector of claim 3, wherein the retention clip has a securing ridge that extends toward the hole and that is configured to prevent the element from sliding off the lip until a user pulls the retention clip away from the hole.

5. The connector of claim 1, wherein the headband-connector body is coupled to the shell-connector body through two movable joints.

6. The connector of claim 5, further comprising a retention clip, at least a portion of the retention clip being movable relative to the shell-connector body, the retention clip being configured to cover an element that extends inward from the hard-hat shell and into engagement with the shell-connector body to retain the element in engagement with the shell-connector body, the headband-connector body being disposed opposite the retention clip from the element when the element is retained in engagement with the shell-connector body such that moving the shell-connector body about the joints provides user access to the retention clip to release the element and separate the connector from the hard-hat shell.

7. The connector of claim 6, wherein the shell-connector body has a bottom-end portion and a top-end portion that, when the shell-connector body is coupled to the hard-hat shell and the suspension-connector body is coupled to the hard-hat suspension, is closer to a crown of the hard-hat shell, wherein the retention clip is coupled to and extends away from the top-end portion of the shell-connector body.

8. The connector of claim 1, wherein, when the shell-connector is coupled to the hard-hat shell and the suspension-connector body is coupled to the hard-hat suspension, the upper portion of the headband-connector body is disposed closer to a crown of the hard-hat shell than the lower portion of the headband-connector body.

9. A connector for connecting a hard-hat suspension to a hard-hat shell, the connector comprising:
a shell-connector body that is configured to removably couple to the hard-hat shell;
a suspension-connector body that is configured to couple to the hard-hat suspension;
a shock absorber operatively disposed between the shell-connector body and the suspension-connector body to absorb at least a portion of a force of impact delivered to the hard-hat shell; and
a retention clip, at least a portion of the retention clip being movable relative to the shell-connector body, the retention clip being configured to cover an element that extends inward from the hard-hat shell and into engagement with the shell-connector body to retain the element in engagement with the shell-connector body, the retention clip being disposed opposite the element from the hard-hat shell;
wherein a first portion of the hard-hat shell is closer to the element than any other portion of the hard-hat shell, wherein the retention clip is configured to cover the element that extends inward from the hard-hat shell when the retention clip is disposed opposite the element from the first portion of the hard-hat shell while the element is in engagement with the shell-connector body.

10. The connector of claim 9, wherein the shell-connector body defines a hole and a lip radially extending inward from the perimeter of the hole, the lip and the retention clip being disposed on opposite sides of the element when the element is retained in engagement with the shell-connector body to prevent the shell-connector body from being pulled away from the hard-hat shell.

11. The connector of claim 10, wherein the retention clip has a securing ridge that extends toward the hole and that is configured to prevent the element from sliding off the lip until a user pulls the retention clip away from the hole.

12. The connector of claim 9, further comprising a headband-connector body having a first portion configured to couple to a hard-hat headband, a platform including an upper portion and an opposing lower portion, and the first portion of the headband-connector body extends from the platform, the headband-connector body being coupled to another portion of the connector at only the lower portion of the headband-connector body while neither the upper portion nor the first portion of the headband-connector body couple to other portions of the connector.

13. The connector of claim 12, wherein the headband-connector body is coupled to the shell-connector body through two movable joints.

14. The connector of claim 13, wherein the headband-connector body is disposed opposite the retention clip from the element when the element is retained in engagement with the shell-connector body such that moving the shell-connector body about the joints provides user access to the retention clip to release the element and separate the connector from the hard-hat shell.

15. The connector of claim 12, wherein, when the shell-connector body is coupled to the hard-hat shell and the suspension-connector body is coupled to the hard-hat suspension, the upper portion of the headband-connector body is disposed closer to a crown of the hard-hat shell than the lower portion of the headband-connector body.

16. The connector of claim 9, wherein the shell-connector body has a bottom-end portion and a top-end portion that, when the shell-connector body is coupled to the hard-hat shell and the suspension-connector body is coupled to the hard-hat suspension, is closer to a crown of the hard-hat shell, wherein the retention clip is coupled to and extends away from the top-end portion of the shell-connector body.

* * * * *